US008227759B2

(12) United States Patent
Fukuchi et al.

(10) Patent No.: US 8,227,759 B2
(45) Date of Patent: Jul. 24, 2012

(54) SEMICONDUCTOR RADIATION DETECTION APPARATUS

(75) Inventors: Tomonori Fukuchi, Wako (JP); Shinji Motomura, Wako (JP); Shuichi Enomoto, Wako (JP); Yousuke Kanayama, Wako (JP)

(73) Assignee: Riken, Saitama (JP)

( * ) Notice: Subject to any disclaimer, the term of this patent is extended or adjusted under 35 U.S.C. 154(b) by 373 days.

(21) Appl. No.: 12/607,348

(22) Filed: Oct. 28, 2009

(65) Prior Publication Data
US 2010/0102240 A1    Apr. 29, 2010

(30) Foreign Application Priority Data

Oct. 29, 2008  (JP) ................................. 2008-278727

(51) Int. Cl.
*G01T 1/24*  (2006.01)
(52) U.S. Cl. .................................................... 250/370.1
(58) Field of Classification Search ................ 250/370.1
See application file for complete search history.

(56) References Cited

U.S. PATENT DOCUMENTS

| 5,107,122 | A  | * | 4/1992 | Barkan et al. ............ 250/370.01 |
| 6,169,287 | B1 | * | 1/2001 | Warburton ................. 250/370.1 |
| 2005/0139775 | A1 | | 6/2005 | Gono et al. |

FOREIGN PATENT DOCUMENTS

JP    2005-208057    8/2005

OTHER PUBLICATIONS

Vetter et al., Three-Dimensional Position Sensitivity in Two-Dimensionally Segmented HP-Ge Detectors, 2000, pp. 223-238, Nuclear Instruments and Methods in Physics Research.

* cited by examiner

*Primary Examiner* — Constantine Hannaher
(74) *Attorney, Agent, or Firm* — Alston & Bird LLP

(57) ABSTRACT

The apparatus has an energy calculation section 32 that calculates energy deposit values of interactions based on signals obtained from segmented electrodes 11, 12 provided on two opposite surfaces of a semiconductor crystal, a reference waveform storing section 33 that stores beforehand waveforms that will be obtained from the segmented electrodes when a single interaction occurs for multiple positions in the crystal, a waveform synthesis section 34 that synthesizes reference waveforms corresponding to arbitrary two points in the crystal as candidate points of interaction at a ratio equal to a ratio of their energy deposit values, and a comparison section 35 that compares a measured waveform and the synthesized waveforms. The candidate points from which the synthesized waveform most similar to the measured waveform is obtained is determined to be the positions of interactions. Thus, even in cases where multiple interactions occur, the positions of the interactions can be detected.

15 Claims, 13 Drawing Sheets

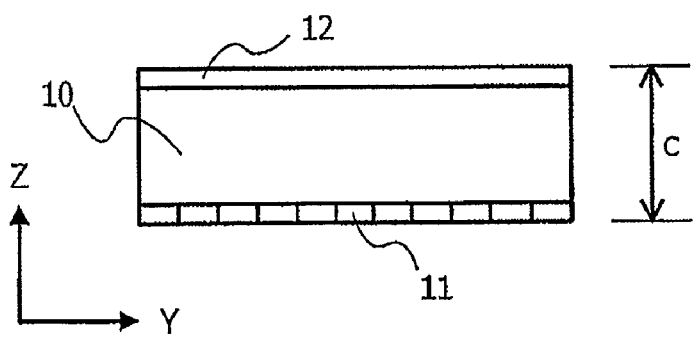
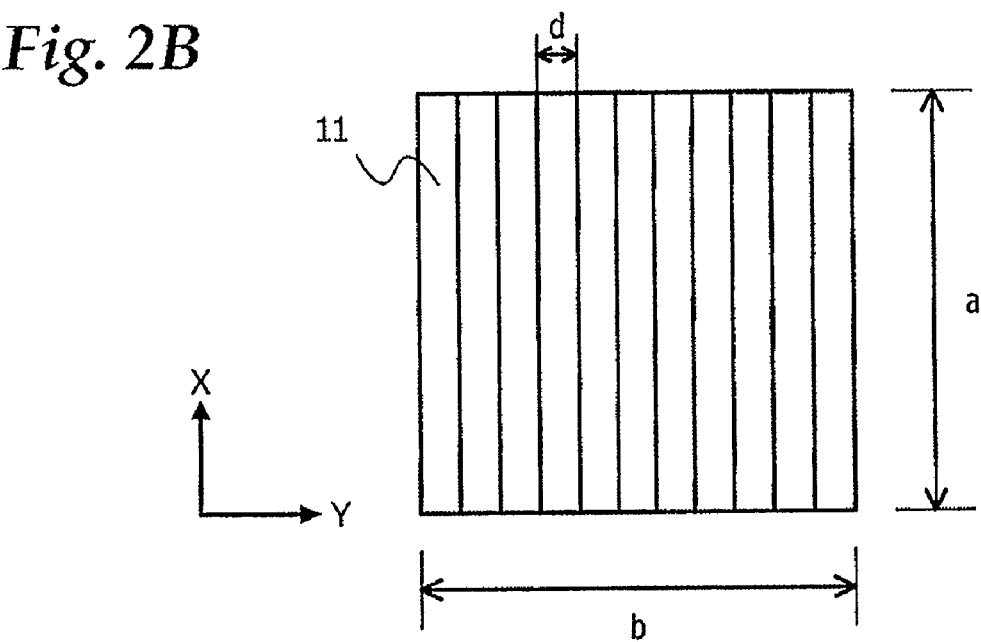
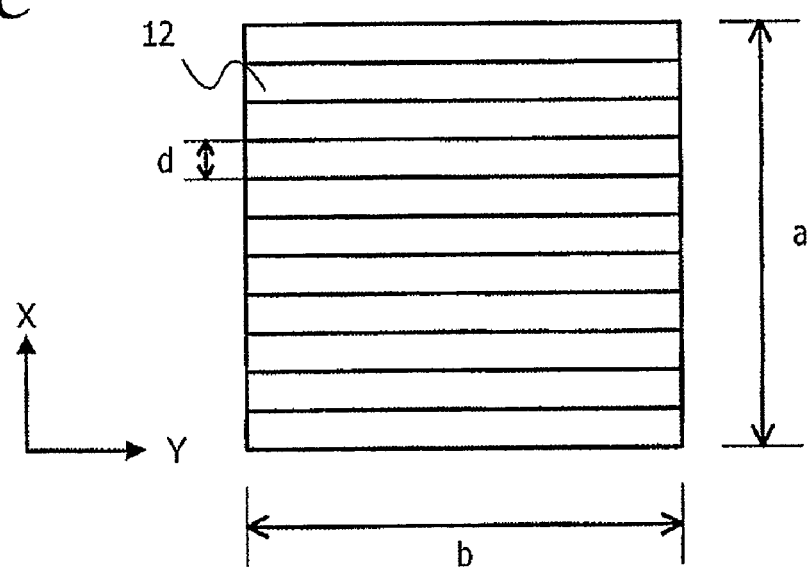

SEMICONDUCTOR RADIATION DETECTION APPARATUS

CROSS-REFERENCE TO RELATED APPLICATIONS

This application claims priority to Japanese Patent Application No. 2008-278727, filed on Oct. 29, 2008, the contents of which are wholly incorporated by reference for all that it teaches.

BACKGROUND OF THE INVENTION

1. Field of the Invention

The present invention relates to a semiconductor radiation detection apparatus that detects radiation such as X-ray and gamma ray.

2. Description of Related Art

The semiconductor detector detects X-ray or gamma ray utilizing creation of a charge (i.e. an electron-hole pair) in a semiconductor crystal by an interaction (such as the photoelectric effect, Compton scattering, or electron pair creation) between the X-ray or gamma ray with the semiconductor crystal. The semiconductor detector has electrodes provided on two opposite sides of a semiconductor crystal and applies a bias voltage between the electrodes to thereby pickup a charge created in the crystal as signals from the respective electrodes, based on which the position at which an interaction occurs is detected.

There are various types of specific arrangements of the electrodes in semiconductor detectors. For example, there has been known a cross strip type detector that has a plurality of strip-like electrodes arranged in directions perpendicular to each other on both sides of a plate-like crystal. There also is a pixel type detector in which grid-like electrodes are provided on one side of a plate-like crystal and a single electrode is provided on the other side. Furthermore, there is a coaxial type detector using a cylindrical semiconductor having a hollow portion provided at the center thereof, in which electrodes are provided on the outer circumferential surface and the inner circumferential surface.

In any type of semiconductor detector, signals are obtained from multiple electrodes when an interaction between radiation and the semiconductor crystal occurs, and the signal obtained from the electrode provided at a position corresponding to the position at which the interaction occurs has the largest amplitude. Therefore, the position of the interaction can be detected by analyzing signals obtained from the electrodes.

However, in the above-described method of detecting the position of an interaction, the accuracy in detecting the interaction position is as fine as the size of the electrodes at best. Patent document 1 specified below discloses a semiconductor radiation detection apparatus that can detect the position of an interaction with an accuracy finer than the size of the electrodes by analyzing signal waveforms. Patent document 1 discloses a cross strip type detector in which the position of an interaction with respect to the depth direction is determined based on a difference in the rise time of signals between the anode and cathode closest to the interaction point. In addition, the position of the interaction in a plane parallel to the electrodes is determined based on the ratio of amplitudes of signals obtained from electrodes adjacent to the electrode closest to the interaction point.

Non-patent document 1 discloses another technology of detecting the position of an interaction. According to this technology, waveforms (reference waveforms) of signals obtained from an electrode when an interaction occurs at specific positions are obtained by experimental measurement and stored beforehand. In the actual detection, the waveform of a signal obtained upon detection is compared with the reference waveforms, and the position for which the waveform of the detected signal is most similar to the reference waveform is determined as the position of the interaction.

Patent Document 1: Japanese Patent Application Laid-Open No. 2005-208057

Non-Patent Document 1: K. Vetter et. al, Three-dimensional position sensitivity in two-dimensionally segmented HP-Ge detectors, Nuclear Instruments and Method in Physics Research, A452, P. 223, 2000.

SUMMARY OF THE INVENTION

In the above-described prior art methods, the position of an interaction can be detected only in the case where the interaction of radiation and a semiconductor crystal occurs only once. In other words, the interaction position cannot be detected in cases where an interaction between radiation and the semiconductor crystal occurs multiple times. The reason why the interaction position cannot be detected by the above-described method in such cases is that when multiple interactions occurs multiple times, superposition of signal waveforms generated upon interactions occurs.

Semiconductor radiation detection apparatuses are required to detect the position of an interaction with high accuracy irrespective of the number of times of occurrence of the interaction. In addition, the apparatuses are required to detect the position of the interaction in a short time.

In view of the above, an object of the present invention is to provide a semiconductor radiation detection apparatus that can detect the position of each interaction with high accuracy even when multiple interactions occur.

Another object of the present invention is to provide a semiconductor radiation detection apparatus that can detect the position of an interaction efficiently and accurately.

According to a first aspect of the present invention, there is provided a semiconductor radiation detection apparatus that has a semiconductor detector including a semiconductor crystal, a plurality of segmented electrodes provided on a first surface of said crystal, and one or plurality of electrodes provided on a second surface of said crystal and detects, when an interaction of radiation occurs multiple times, the positions of the multiple interactions based on a signal obtained from the semiconductor detector.

The semiconductor radiation detection apparatus according to the first aspect of the present invention comprises storing means, energy calculation means, synthesized waveform calculation means, and interaction position detection means.

The storing means stores beforehand waveforms (or reference waveforms) of signals that will be obtained from said segmented electrodes when a single interaction occurs, for a plurality of positions in said crystal. The reference waveforms may be obtained in advance by either actual experimental measurements or numerical simulations.

The energy calculation means calculates energy deposit values at the interaction positions based on signals obtained from segmented electrodes corresponding to the interaction positions. The segmented electrodes corresponding to the interaction positions refer to segmented electrodes to which a charge or hole generated by interaction moves. Which segmented electrodes are the electrodes corresponding to the interaction positions can be discriminated based on a difference in the waveforms of signals obtained from the segmented electrodes. The energy deposit value is calculated for each of the positions at which multiple interactions occur.

The synthesized waveform calculation means calculates signal waveforms that will be obtained from a segmented electrode when interactions occur at two arbitrary points (or candidate points) in the crystal. More specifically, the signal waveforms are calculated by superposing reference waveforms stored in the storing means that will be obtained when a single interaction occurs at each candidate point. In this superposition, the synthesized waveform calculation means synthesizes the reference waveforms at a ratio equal to a ratio of the corresponding energy deposit values calculated by the aforementioned energy calculation means.

The interaction position detection means compares the synthesized waveforms with a waveform obtained from the segmented electrode and determines that candidate points from which the synthesized waveform most similar to the waveform obtained from the segmented electrode is obtained are the interaction positions. Specifically, synthesized waveforms are calculated by the aforementioned synthesized waveform calculation means for combinations of two arbitrary points, and the waveforms thus calculated are compared with a signal waveform obtained from the segmented electrode, whereby the positions of the respective interactions are determined.

As described above, according to the first aspect of the present invention, even in the case where multiple interactions occur in the crystal, the positions of the respective interactions can be calculated with an accuracy finer than the size of the segmented electrode.

In the apparatus according to the first aspect of the present invention, it is preferred that the apparatus further comprise interaction region estimation means for roughly estimating the interaction position from the waveform of a signal obtained from a segmented electrode. In this case, the interaction position detection means may perform synthesis of reference waveforms only for candidate points in the estimated region and compares them with the waveform obtained from the segmented electrode.

By narrowing down the region in which the interaction point possibly exists in this way, it is not necessary to perform synthesis of reference waveforms and comparison of the synthesized waveforms and the signal waveform for all the combinations of two arbitrary points in the crystal. In consequence, the processing time can be shortened. Since the number of times of comparison is equal to the number of combinations of two candidate points, if the region of one interaction point can be reduced to 1/n of the entire region, the number of times of comparison can effectively be reduced to $1/n^2$.

It is preferred that the interaction region estimation means estimate the depth of the interaction position from a surface of the crystal based on the difference between the time taken from the occurrence of the interaction until the amplitude of a signal obtained from a segmented electrode provided on the first surface reaches a specific fraction of its maximum value and the time taken from the occurrence of the interaction until the amplitude of a signal obtained from a segmented electrode provided on the second surface reaches the specific fraction of its maximum value.

The timing of the rise of the signal waveform varies depending on the depth of the interaction position. Specifically, while if an interaction occurs at a position close to an electrode, the signal rises relatively earlier, if an interaction occurs at a position distant from the electrode, the signal rises relatively later. Therefore, the depth of the interaction position from the surface of the crystal can be estimated to some extent based on the time taken until the amplitude of the signal waveform reaches a specific fraction, e.g. 50%, of its maximum value.

It is preferred that the interaction region estimation means estimate the interaction position in a plane parallel to the segmented electrodes based on the ratio of the amplitudes of signals obtained from segmented electrodes adjacent to the segmented electrode corresponding to the position at which the interaction occurs.

In the case where the segmented electrodes have the same shape, the values of signals obtained from the segmented electrodes adjacent to the electrode corresponding to the interaction position are indicative of the distances between the interaction position and the respective adjacent electrodes. Therefore, the interaction position in a plane parallel to the segmented electrodes can be determined based on the ratio of the amplitudes of the signals obtained from the adjacent electrodes. On the other hand, in the case where the segmented electrodes have different shapes, it is necessary to take into account the shapes of the electrodes in addition to the ratio of the signal amplitudes to determine the interaction position in a plane parallel to the segmented electrodes.

In the calculation of the interaction position in a plane parallel to the segmented electrodes, it is preferred to calculate a sum of the absolute values of differences between the signal values of the adjacent segmented electrodes or differences between the absolute signal values of the adjacent segmented electrodes at different times and determine the interaction position in the plane parallel to the segmented electrodes based on the sum. It is preferred that this process be performed on signals obtained by digitizing the signals obtained from the segmented electrodes.

The signals obtained from the adjacent electrodes are weak and likely to be affected by noises. In the case where the absolute value of the difference of the signals is obtained at different times, influences of noises that are generated in the adjacent electrodes synchronously can be reduced, and the interaction position can be determined with an improved accuracy.

According to a second aspect of the present invention, there is provided a semiconductor radiation detection apparatus that can detect, when a single interaction occurs, the position of the interaction efficiently. The semiconductor radiation detection apparatus according to the second aspect stores beforehand waveforms of signals that will be obtained when a single interaction occurs as reference waveforms, for a plurality of positions in the crystal, and determines that a position for which the reference waveform and an actually measured signal waveform are most similar is the interaction position. In addition, the apparatus has interaction region estimation means for roughly estimating the interaction position from the waveform of a signal obtained from a segmented electrode, and compares the signal waveform obtained from the segmented electrode and the reference waveforms for positions in the region estimated by the interaction position estimation means to determine the interaction position.

With the above feature, it is not necessary to compare the signal waveform obtained from the segmented electrode with all the reference waveforms, it is possible to detect the interaction position efficiently in a short time.

In the apparatus according to the second aspect of the present invention, the interaction region estimation means may estimate the depth of the interaction position from a surface of the crystal based on the difference between the time taken from the occurrence of the interaction until the amplitude of a signal obtained from a segmented electrode provided on the first surface reaches a specific fraction of its maximum value and the time taken from the occurrence of the interaction until the amplitude of a signal obtained from a segmented electrode provided on the second surface reaches the specific fraction of its maximum value.

The timing of the rise of the signal waveform varies depending on the depth of the interaction position. Specifically, while if an interaction occurs at a position close to an electrode, the signal rises relatively earlier, if an interaction occurs at a position distant from the electrode, the signal rises relatively later. Therefore, the depth of the interaction position from the surface of the crystal can be estimated to some extent based on the time until the amplitude of the signal waveform reaches a specific fraction, e.g. 50%, of its maximum value.

The interaction region estimation means may estimate the interaction position in a plane parallel to the segmented electrodes based on the ratio of the amplitudes of signals obtained from segmented electrodes adjacent to the segmented electrode corresponding to the position at which the interaction occurs.

In the case where the segmented electrodes have the same shape, the values of signals obtained from the segmented electrodes adjacent to the electrode corresponding to the interaction position are indicative of the distances between the interaction position and the respective adjacent electrodes. Therefore, the interaction position in a plane parallel to the segmented electrodes can be determined based on the ratio of the amplitudes of the signals obtained from the adjacent electrodes. On the other hand, in the case where the segmented electrodes have different shapes, it is necessary to take into account the shapes of the electrodes in addition to the ratio of the signal amplitudes to determine the interaction position in a plane parallel to the segmented electrodes.

In the calculation of the interaction position in a plane parallel to the segmented electrodes, it is preferred to calculate a sum of the absolute values of differences between the signal values of the adjacent segmented electrodes or differences between the absolute signal values of the adjacent segmented electrodes at different times and determine the interaction position in the plane parallel to the segmented electrodes based on the sum. It is preferred that this process be performed on signals obtained by digitizing the signals obtained from the segmented electrodes.

The signals obtained from the adjacent electrodes are weak and likely to be affected by noises. In the case where the absolute value of the difference of the signals is obtained at different times, influences of noises that are generated in the adjacent electrodes synchronously can be reduced, and the interaction position can be determined with an improved accuracy.

According to a third aspect of the present invention, there is provided a semiconductor radiation detection apparatus that determines the position of an interaction based on signals obtained from segmented electrodes. In this embodiment, in particular, the interaction position in a plane parallel to the segmented electrodes can be determined with a high accuracy.

Specifically, the semiconductor radiation detection apparatus according to the third aspect of the present invention has a semiconductor detector including a semiconductor crystal, a plurality of segmented electrodes provided on a first surface of said crystal, and one or plurality of electrodes provided on a second surface of said crystal and detects the position of an interaction between radiation and the semiconductor crystal based on a signal obtained from the semiconductor detector. The apparatus comprises interaction position detection means for determining the position of an interaction based on signals obtained from segmented electrodes. The interaction position detection means calculates a sum of the absolute values of differences between the signal values of segmented electrodes adjacent to the segmented electrode corresponding to the position at which the interaction occurs or differences between the absolute signal values of the segmented electrodes adjacent to the segmented electrode corresponding to the position at which the interaction occurs at different times, and determines the interaction position in a plane parallel to the segmented electrodes based on the sum.

According to the semiconductor radiation detection apparatus according to the first aspect of the present invention, even in cases where multiple interactions occur, the positions at which the interactions occur can be determined with a high accuracy.

According to the semiconductor radiation detection apparatus according to the second and the third aspects of the present invention, the position of an interaction can be determined efficiently with a high accuracy.

BRIEF DESCRIPTION OF THE DRAWINGS

FIGS. 2A, 2B, and 2C are diagrams showing the exemplary structure of the flat plate germanium semiconductor detector having segmented electrodes according to the embodiment.

DETAILED DESCRIPTION OF THE INVENTION

In the following, preferred embodiments of the present invention will be described in detail with reference to the drawings by way of example.

First Embodiment

Figure 1:
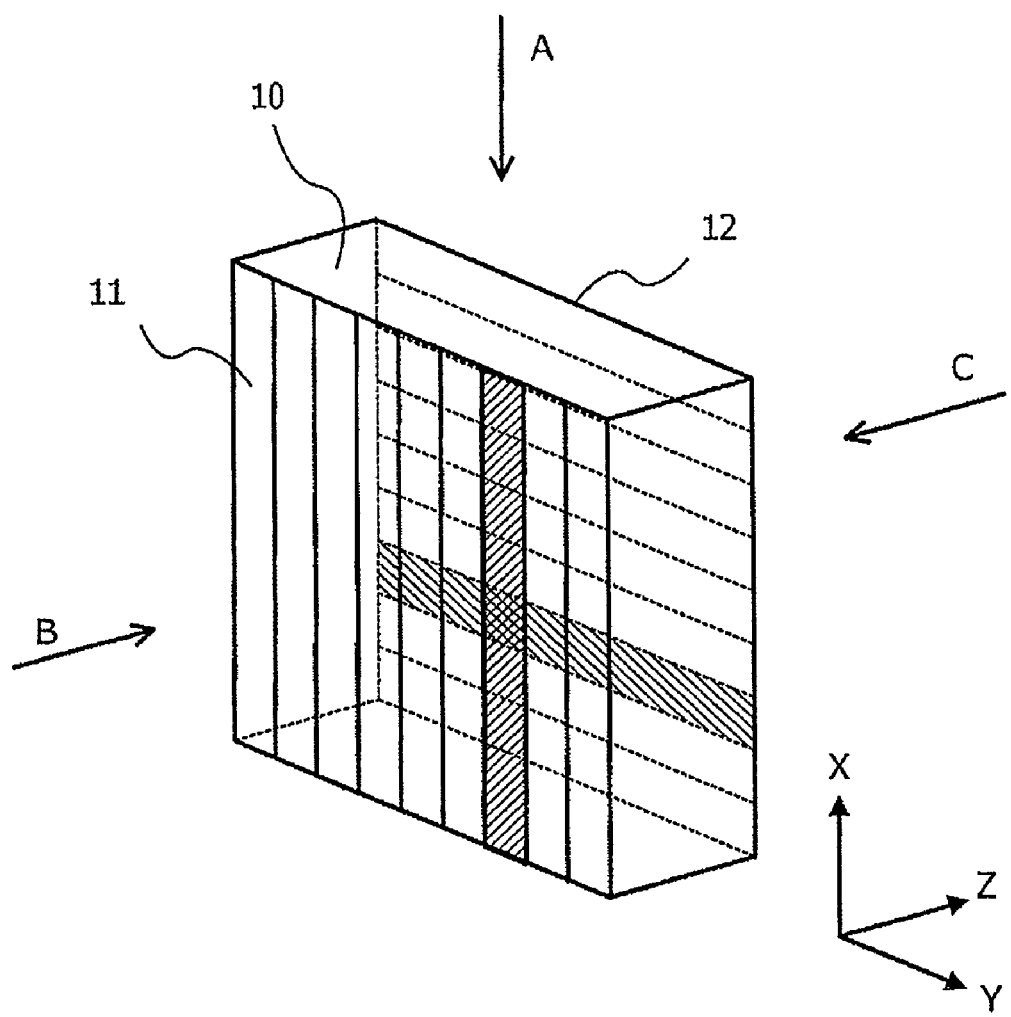
FIG. 1 is a diagram showing an exemplary structure of a flat plate germanium semiconductor detector having segmented electrodes according to an embodiment.

A first embodiment of the present invention is a semiconductor radiation detection apparatus that detects the position of an interaction based on signals obtained from a flat plate germanium semiconductor detector having segmented electrodes. FIGS. 1 and 2 show an exemplary structure of a semiconductor detector used in this embodiment. FIG. 1 is a perspective view of the semiconductor detector used in this embodiment. FIGS. 2A to 2C are views seen from the directions indicated by arrows A, B, and C in FIG. 1 respectively. In the following description, the XYZ coordinate system shown in these drawings will be used.

The detector includes a flat plate-like germanium crystal 10 having a dimension of a×b×c, and electrodes segmented into strips provided on two opposite surfaces thereof. On one side surface of the flat-plate germanium crystal 10, there are densely arranged a plurality of electrode strips 11 each having a width d and a length a elongated along the X direction, as shown in FIG. 2B. On the opposite side surface of the flat-plate germanium crystal 10, there are densely arranged a plurality of electrode strips 12 each having a width d and a length b elongated along the Y direction, as shown in FIG. 2C. The electrodes strips on one side surface are adapted to serve as anodes (which will be hereinafter referred to as anode strips), and the electrode strips on the opposite side surface are adapted to serve as cathodes (which will be hereinafter referred to as cathode strips). In this way, a plurality of anode strips 11 and a plurality of cathode strips 12 extending perpendicularly to each other are respectively provided on two opposite side surfaces of the flat plate germanium crystal 10.

In the exemplary case described in the following, it is assumed that the electrodes on the incidence side of gamma ray are anodes, and the electrodes on the opposite side are cathodes, and dimensions are as follows: a=39 mm, b=39 mm, c=20 mm, and d=3 mm.

Figure 3:
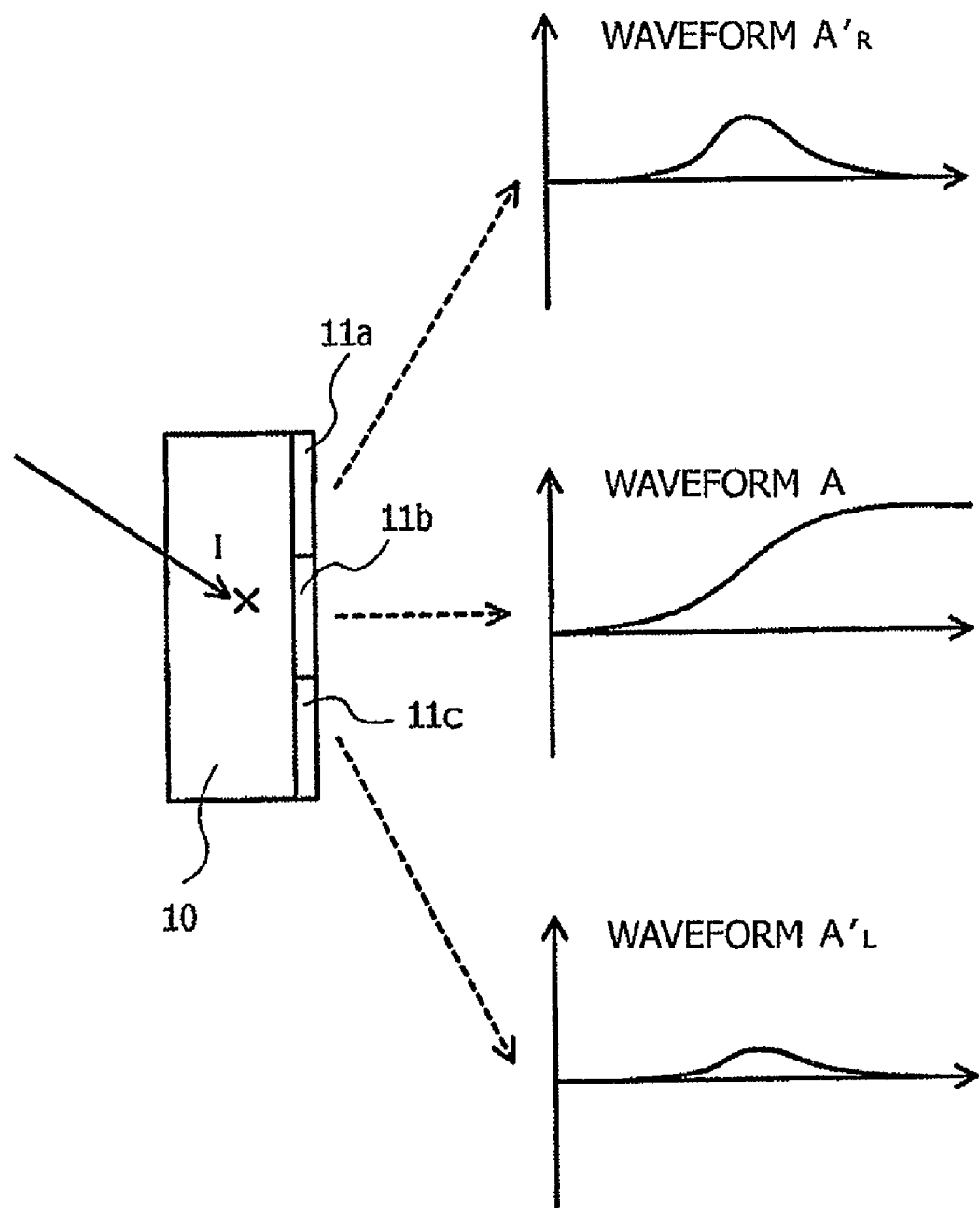
FIG. 3 illustrates waveforms of signals appearing on electrodes when a single interaction occurs.
Figure 4:
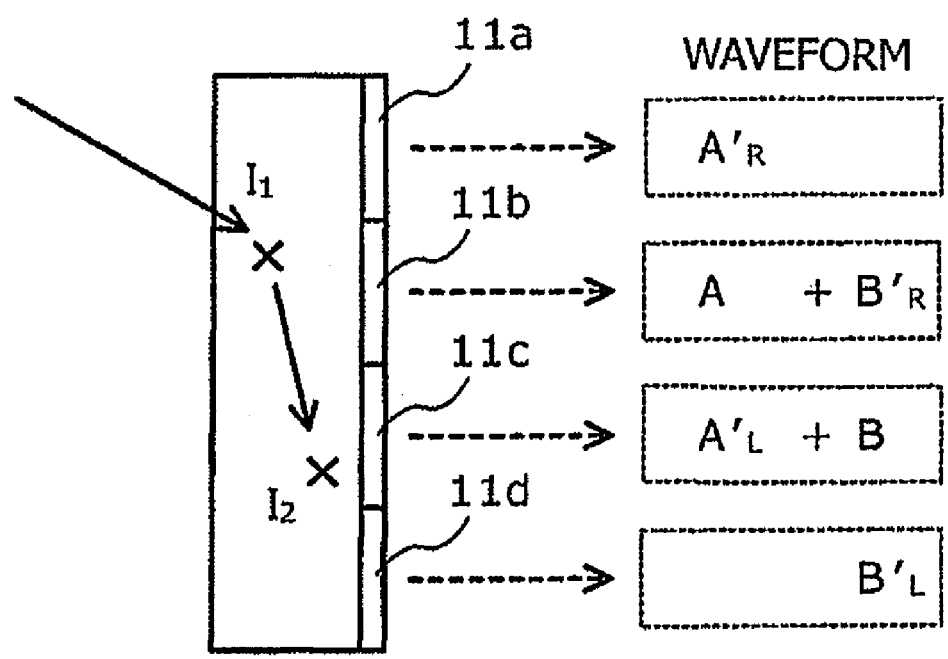
FIG. 4 illustrates waveforms of signals appearing on electrodes when multiple interactions occur.

In such a detector, signals detected when an interaction between gamma ray and the semiconductor crystal 10 occurs are roughly classified into two types. One of them is a charge signal (which will be referred to as a "main signal") that appears on the electrode corresponding to the position at which the interaction of gamma ray occurs. The charge and hole created by the interaction move along the bias electric field. Therefore, in the case of the cross strip type semiconductor detector in which a bias electric field is applied along the direction perpendicular to the flat plate electrodes, if gamma ray causes an interaction at position I as shown in FIG. 3, the main signal is obtained from the electrode 11b closest to the position of interaction I. FIG. 3 only shows signals obtained from cathode strips. Similar signals are also obtained from anode strips. The X and Y coordinates of the point of interaction can be determined from the combination of the anode strip and the cathode strip from which the main signals are obtained, with an accuracy as fine as the width of the strip.

The other type of signal obtained from an electrode when an interaction occurs is a charge induced signal (which will be referred to as a "sub signal") obtained from an electrode in the neighborhood of (or adjacent to) the electrode from which the main signal is obtained. In the case shown in FIG. 3, sub signals $A'_R$ and $A'_L$ are respectively obtained from the two electrodes 11a and 11c adjacent to the electrode 11b. The amplitude of the sub signals are smaller than that of the main signal approximately by an order of magnitude. In the case of the cross strip type semiconductor detector in which the electrodes have the same shape, the sub signal $A'_R$ and $A'_L$ have similar shapes.

Next, a case in which an interaction between gamma ray and the semiconductor crystal occurs twice in this detector will be discussed. Here, it is assumed that two interactions $I_1$, $I_2$ occur at positions corresponding to two adjacent electrodes 11b, 11c. Then, upon occurrence of the first interaction $I_1$, waveforms $A'_R$, A, and $A'_L$ appear respectively on the electrodes 11a, 11b, and 11c. Upon occurrence of the second interaction $I_2$, waveforms $B'_R$, B, and $B'_L$ appear respectively on the electrodes 11b, 11c, and 11d. Thus, a waveform in which signals generated upon first and second interactions are superposed are obtained from the electrodes 11b and 11c.

In this embodiment, when multiple interactions occur, the positions of the multiple interactions can be determined. The waveform that appears when multiple interactions occur is the weighted sum of the waveforms that will appear if single interactions occur at the respective positions independently from each other, where the waveforms are weighted proportionally to the energy deposit values at the respective positions. In this embodiment, a waveform (referred to as reference waveform) that appears when a single interaction occurs is obtained beforehand by an experimental measurement or numerical calculation, and reference waveforms at two arbitrary points are synthesized at a ratio equal to the ratio of the energy deposit values at the respective positions. This synthesis of waveforms is performed for all the combinations of the possible positions of multiple interactions. A plurality of synthesized waveforms thus obtained are compared with an actually obtained waveform, and the positions at which interactions occur can be determined as the combination of positions that provides a synthesized waveform that is most similar to the actually obtained waveform.

Figure 5:
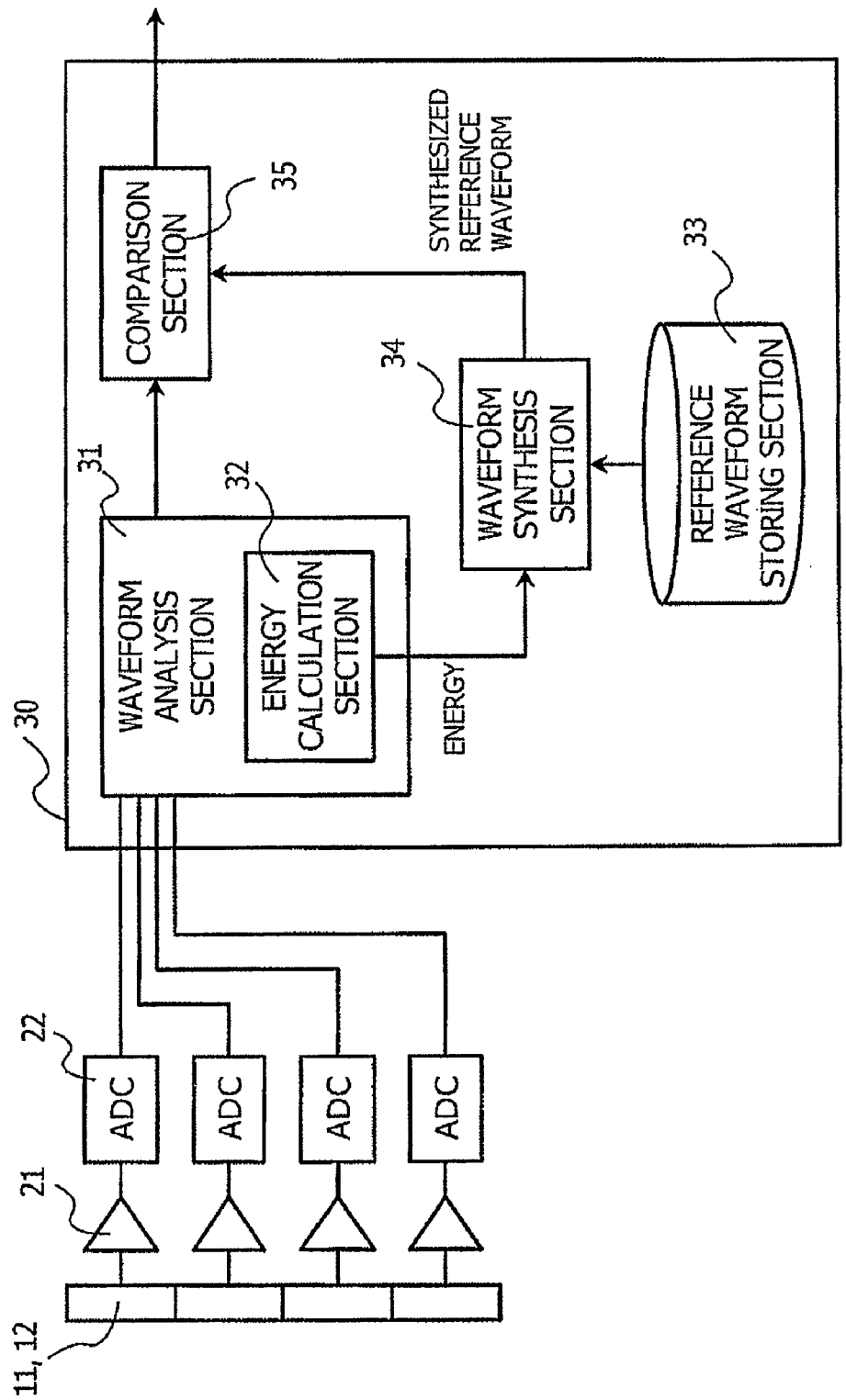
FIG. 5 is a block diagram showing an example of a signal processing section of a flat plate germanium semiconductor detector having segmented electrodes according to a first embodiment.

FIG. 5 is a block diagram showing an exemplary configuration of a signal processing section 30 of the semiconductor radiation detection apparatus according to this embodiment. The signal processing section 30 may be implemented as either hardware circuit such as an FPGA or an ASIC, or software executed on a microcomputer.

Signals obtained from the electrode strips 11, 12 are amplified by preamplifiers 21. The outputs of the preamplifiers 21 are input to analog to digital converters (ADC) 22 and digitized thereby. Here, the signals are digitized with a sampling rate of 100 MHz.

A waveform analysis section 31 obtains the digitized signals, and makes a determination as to whether each electrode strip is a strip corresponding to an interaction point (in other words, the signal is a main signal) or a strip adjacent to the strip corresponding to the interaction point (in other words, a signal is a sub signal), based on the signal waveform obtained from each electrode strip. As shown in FIG. 3, while the main signal has a significant signal value after a lapse of a certain time (e.g. about 300 ns), the wave height of the sub signal at that time is zero. Therefore, whether a strip is the strip corresponding to the interaction point or a strip adjacent thereto can be determined by discriminating this difference in the waveform.

The waveform analysis section 31 analyzes signal waveforms obtained from the electrode strips 11, 12, and when multiple interactions occur, namely when main signals are obtained from a plurality of electrode strips, the positions at which the interactions occur are determined by executing a process that will be described later. In cases where only a single interaction is detected, the position at which the interaction occurs may be determined by a conventional method, on which no particular description will be made in the following.

The energy calculation section 32 determines energy deposit values in interactions based on signal waveforms obtained from the respective electrode strips corresponding to the interaction points. The energy deposit value can be calculated from the wave height of the signal obtained from the electrode strip. The energy deposit value may be determined from an analogue signal, instead of from a digitized signal, using an analogue circuit provided in a separate line.

The reference waveform storing section 33 stores, in advance, signal waveforms (reference waveforms) that will appear on the electrodes if a single interaction occurs. In this embodiment, the reference waveforms are prepared and stored for grid points in a grid having a grid pitch of 1 mm. Since in this embodiment, the anode strip and the cathode strip have a width of 3 mm, and the semiconductor crystal has a thickness of 20 mm, the reference waveforms for 3×3×20 points are obtained and stored.

A waveform synthesis section 34 performs synthesis of reference waveforms for all the combination of possible positions of multiple interactions. In the synthesis, reference waveforms are synthesized at a ratio equal to the ratio of the energies of the corresponding interactions.

More specifically, if two interactions are detected by a first-stage waveform analysis, pairs of anode and cathode strips corresponding to the interaction points are determined. For example, if main signals are obtained from two anode strips and two cathode strips, a determination is made as to which anode strip is associated with which cathode strip by comparing the energy deposit values, whereby positions of the two interactions are determined with an accuracy as fine as the width of the strip. In cases where main signals are obtained from one anode strip and two cathode strips or from one cathode strip and two anode strips also, the positions of two interactions are determined with an accuracy as fine as the width of the strip.

Here the two anode strips corresponding to the positions of two interactions are denoted by A and B, then signal waveforms that will appear on the anode strips A and B are obtained by the following synthesis.

$$W_A(t)=(E_A W_{A,i}(t)+E_B W_{B',j}(t))/(E_A+E_B)$$

$$W_B(t)=(E_A W_{A',i}(t)+E_B W_{B,j}(t))/(E_A+E_B) \quad \text{(formula 1)}$$

Here, $E_A$ and $E_B$ are the energy deposit values at the respective interaction sites corresponding to the anodes A and B calculated by the energy calculation section 32, suffixes "i" and "j" specify grid points in the interaction sites (a region having dimensions of 3 mm×3 mm×20 mm) respectively corresponding to the anode strips A and B, $W_{A,i}$ is the waveform of a main signal in the case where an interaction occurs at the i-th grid point, $W_{A',i}$ is the waveform of a sub signal (appearing in the strip B) in the case where an interaction occurs at the i-th grid point, and $W_{B,j}$ and $W_{B',j}$ are similar to $W_{A,i}$ and $W_{A',i}$.

The waveform synthesis section 34 obtains synthesized waveforms like above for all the combinations of the grid points i and j, which numbers $(3\times3\times20)^2$.

A comparison section 35 compares waveforms synthesized by the waveform synthesis section 34 with a signal waveform that is actually obtained to determine the synthesized waveform that is most similar to the actually obtained waveform. The most similar waveform can be obtained, for example, as the waveform having the minimum least square error. If the waveform most similar to the actual waveform is determined, the grid points i, j that provide the most similar waveform are determined to be the positions at which the two interactions occur.

Figure 6:
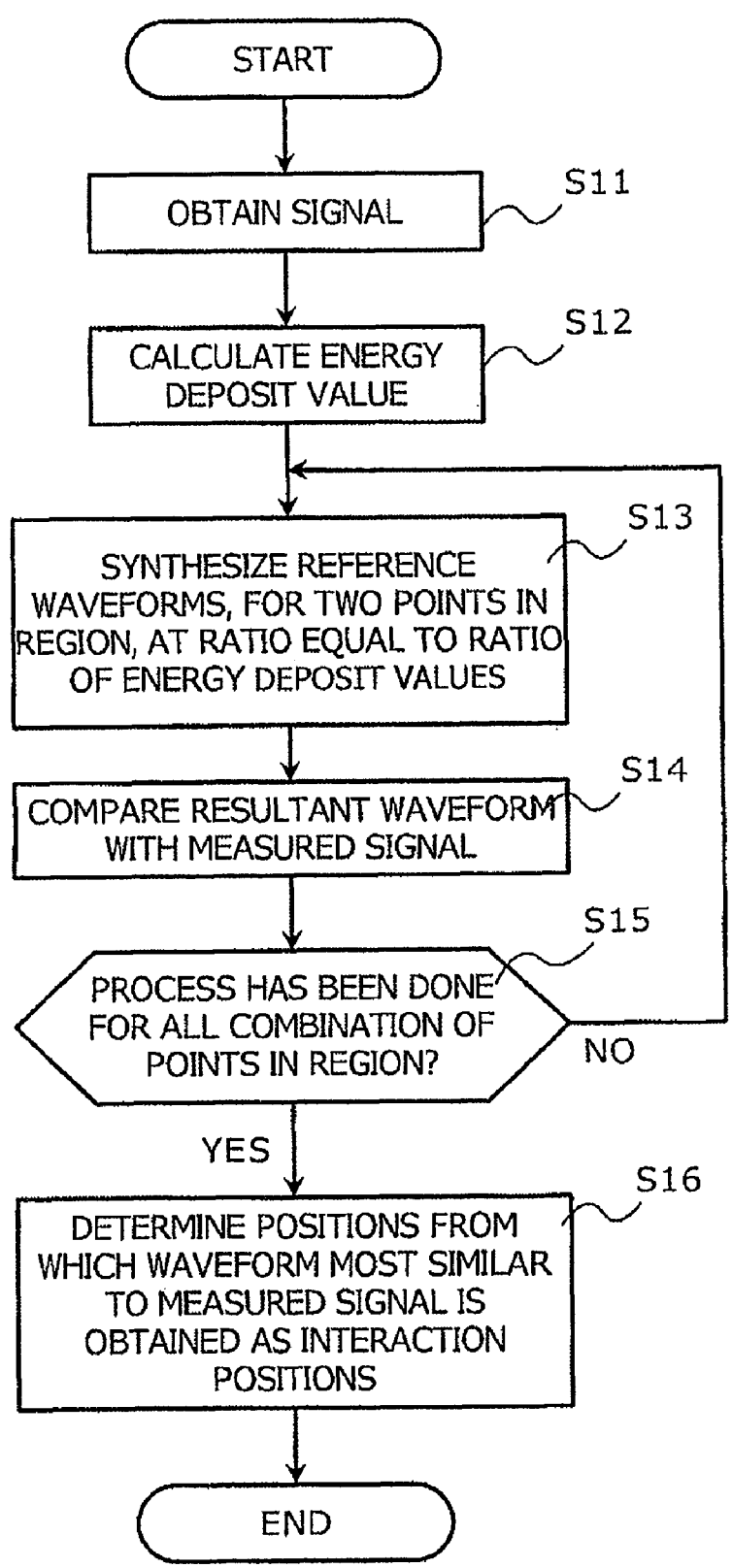
FIG. 6 is a flow chart of signal processing in the first embodiment.

FIG. 6 is a flow chart of a process executed in the signal processing section 30. The signal processing section 30 obtains digitized signals (step S11) and determines electrode strips that correspond to the positions of interactions. Then, the energy calculation section 32 calculates the energy deposit values of the respective interactions based on the wave height values of the main signals obtained from the respective electrode strips (step S12). The waveform synthesis section 34 synthesizes reference waveforms at a ratio equal to the ratio of the energies of the respective interactions, for arbitrary candidate points of interactions, namely for the aforementioned grid points, which are within regions defined by pairs of anode and cathode strips (step S13). Then, the comparison section 35 compares a synthesized waveform and the actual waveform (step S14), and if this synthesized waveform is most similar to the actual waveform among the waveforms for which the comparison has been performed, the positions of the candidate points corresponding thereto are stored. The candidate positions of interactions include all the combinations of the grid points in the determined regions, and if the comparison process has not been done for all the combinations (i.e. if step S15 is answered "NO"), the process returns to step S13. If the comparison of the synthesized waveform and the actual waveform has been done for all the combinations (i.e. if step S15 is answered "YES"), the positions of the candidate points that provide the waveform that is most similar to the measured waveform are determined as the positions of interactions (step S16).

According to this embodiment as described above, when multiple interactions occur, the positions of the respective interactions can be determined with an accuracy finer than the size of the regions defined by pairs of anode and cathode strips, namely with an accuracy as fine as the grid pitch of 1 mm.

Second Embodiment

A second embodiment is basically similar to the first embodiment, but in the second embodiment the candidate regions of interactions are narrowed down to some extent based on the obtained signals, and synthesis of reference waveforms and comparison of the waveforms are performed only in the narrowed-down regions, whereby the efficiency of the process is improved.

Figure 7:
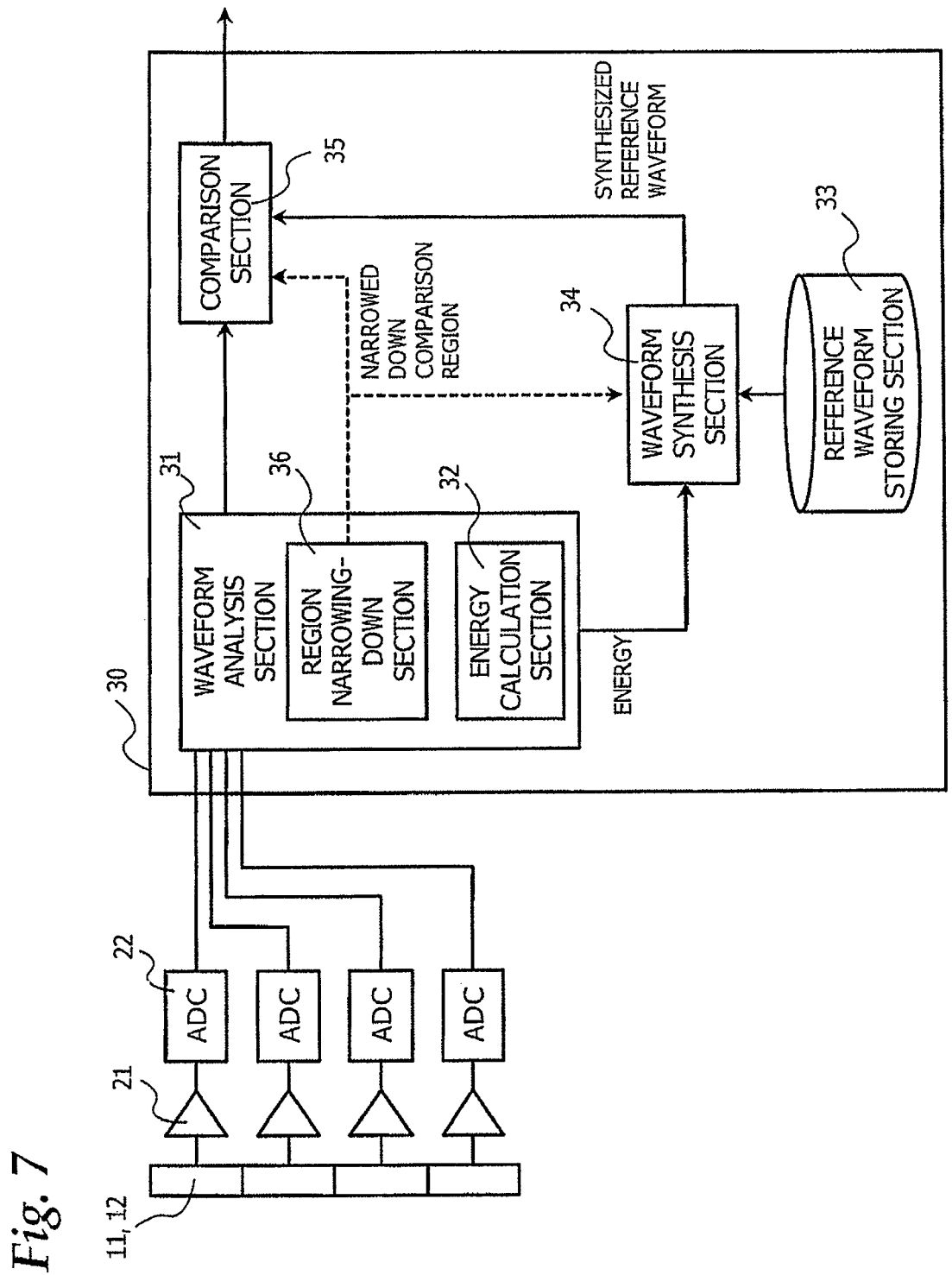
FIG. 7 is a block diagram showing an example of a signal processing section of a flat plate germanium semiconductor detector having segmented electrodes according to a second embodiment.
Figure 8:
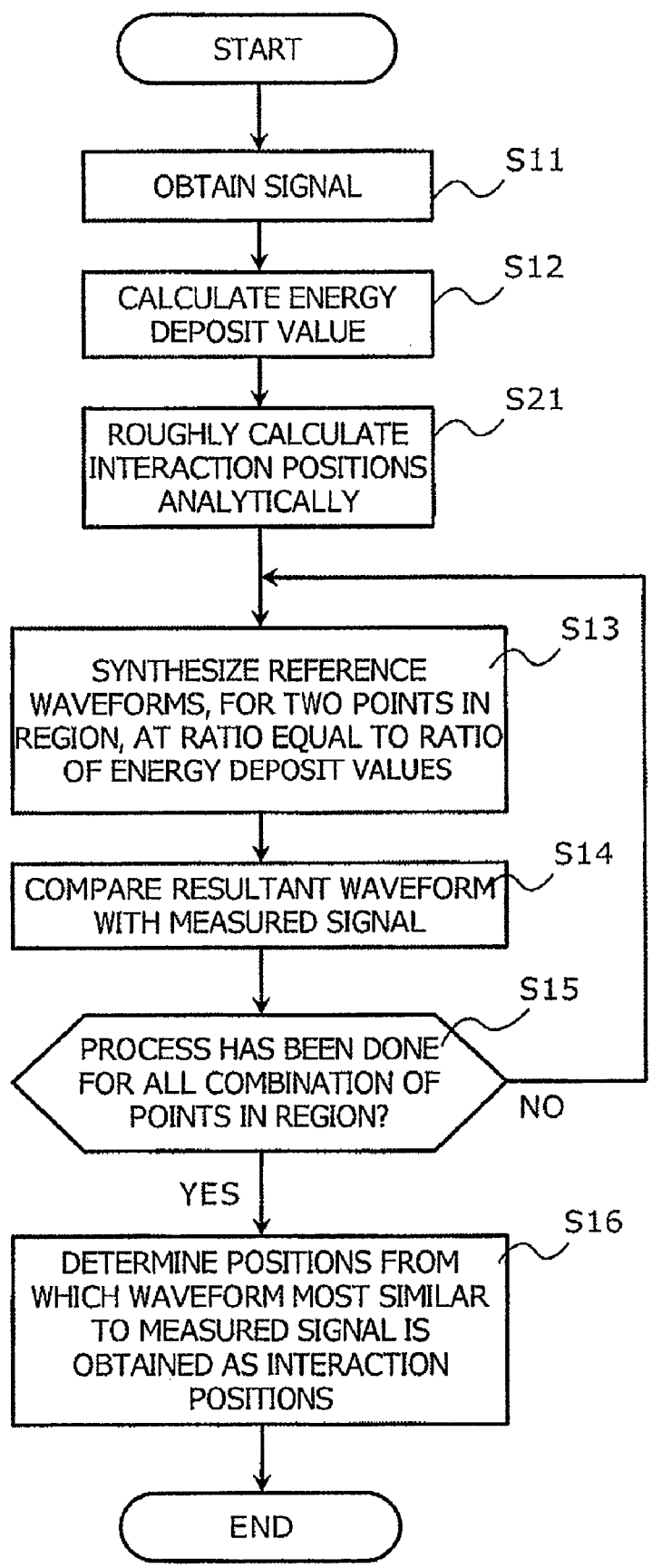
FIG. 8 is a flow chart of signal processing in the second embodiment.

The structure of the semiconductor radiation detection apparatus according to this embodiment is the same as that of the first embodiment, and this embodiment differs from the first embodiment only in the functional configuration of the signal processing section. FIG. 7 is a block diagram showing an exemplary configuration of the signal processing section 30 of the detection apparatus according to this embodiment. FIG. 8 is a flow chart of a process executed in the signal processing section 30 in this embodiment. What is different in this embodiment from the first embodiment is that a region narrowing-down section 36 is provided, and the positions of interactions are roughly determined by analyzing obtained signals (step S21). This provides the aforementioned improvement in the efficiency of the process. In connection with this, the region referred to in step S15 means the narrowed-down region roughly determined in step S21.

In the following, the region narrowing-down section 36 will be specifically described. The region narrowing-down section 36 delimits the positions of interactions within regions smaller than regions defined by pairs of anode and cathode electrodes by analyzing signal waveforms obtained from the electrodes. In this process, the positions are delimited with respect to the depth direction (Z) and/or in the X-Y plane.

Figure 9:
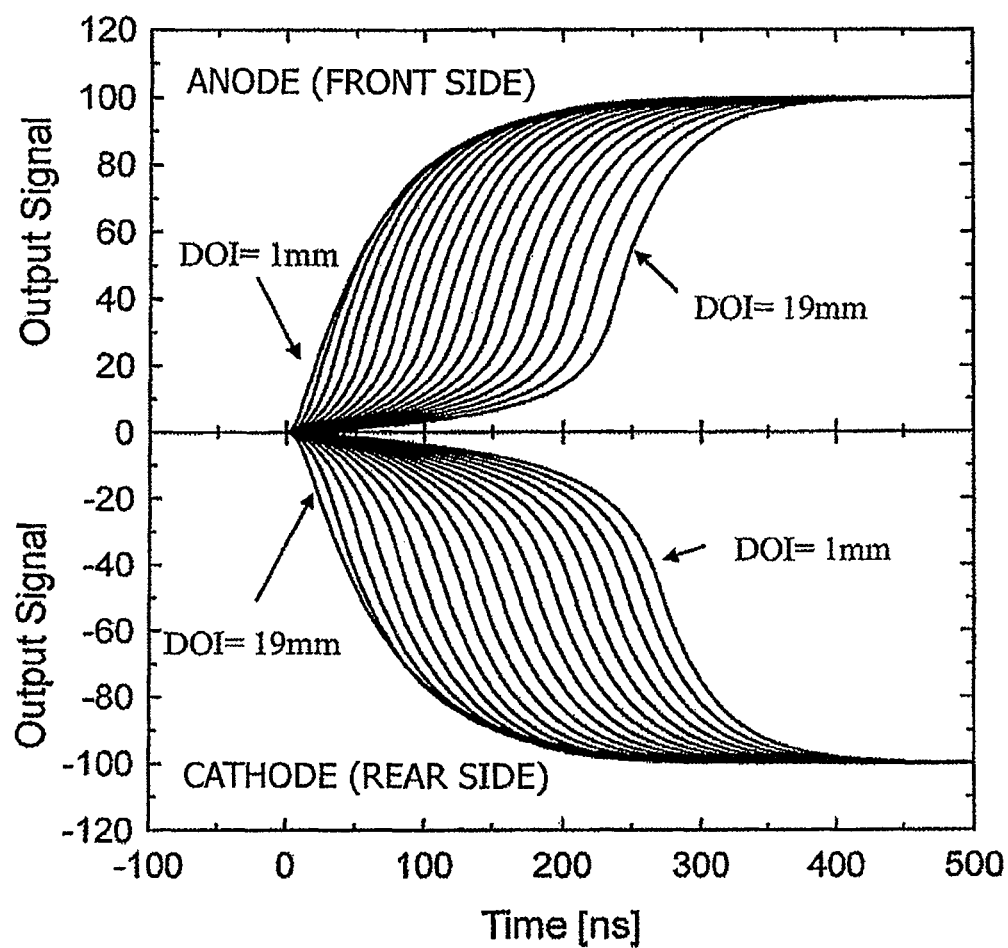
FIG. 9 shows variations in the waveform of signals obtained from an anode strip and a cathode strip according to differences in the interaction position with respect to the depth direction (DOI).

First, the method of delimiting the positions of interactions with respect to the Z direction will be described. FIG. 9 shows signal waveforms that will be obtained from an anode strip and a cathode strip when a single interaction between gamma ray and the germanium crystal occurs. These waveforms were obtained by numerical simulations. The signals shown in FIG. 9 are obtained from the anode strip and the cathode strip that are closest to the point of interaction. From FIG. 9, it will be understood that the signal waveform varies with changes in the position of the gamma ray interaction point with respect to the depth direction (or DOI: Depth Of Interaction). When the DOI measured from the incidence side surface of the germanium crystal is small, namely when the interaction point is close to the anode strip, the signal waveform obtained from the anode strip 11 on the gamma ray incidence side rises quickly, and as the DOI becomes larger, namely as the interaction point becomes more distant from the anode strip 11, the timing of rise of the signal waveform becomes later. In contrast, the signal obtained from the cathode strip 12 provided on the rear side of the germanium crystal rises quickly when the DOI measured from the incidence side of the germanium crystal is large, namely when the interaction point is close to the cathode strip 12. As the DOI measured from the incidence side surface of the germanium crystal becomes smaller, namely as the point of interaction becomes more distant from the cathode strip 12, the timing of rise of the signal becomes later.

Therefore, the region narrowing-down section 36 can determine the position of the interaction point with respect to the depth direction based on the signals obtained from the anode strip 11 and the cathode strip 12 corresponding to the point of interaction. For example, the DOI can be determined from the difference between the time taken until the amplitude of the signal waveform obtained from the anode strip reaches 50% of its maximum value and the time taken until the amplitude of the signal waveform obtained from the cathode strip reaches 50% of its maximum value.

FIG. 9 shows waveforms obtained in cases where a single interaction occurs. In cases where multiple interactions occur, the obtained signal waveform will be a superposition of a main signal resulting from one interaction and a sub signal resulting from the other interaction. In consequence, the DOI determined by the above-described analysis may not be so accurate. However, since the amplitude of the sub signal is smaller than that of the main signal by an order of magnitude, it is possible to roughly determine the DOI, and the positions of the interactions can be delimited roughly.

When multiple interactions occur, the DOI can be determined from the signal waveforms only in the case where both the anode strip and the cathode strip corresponding to the interaction position differ among the interactions. In this case, the position of each interaction with respect to the depth direction can be roughly determined.

Figure 10:
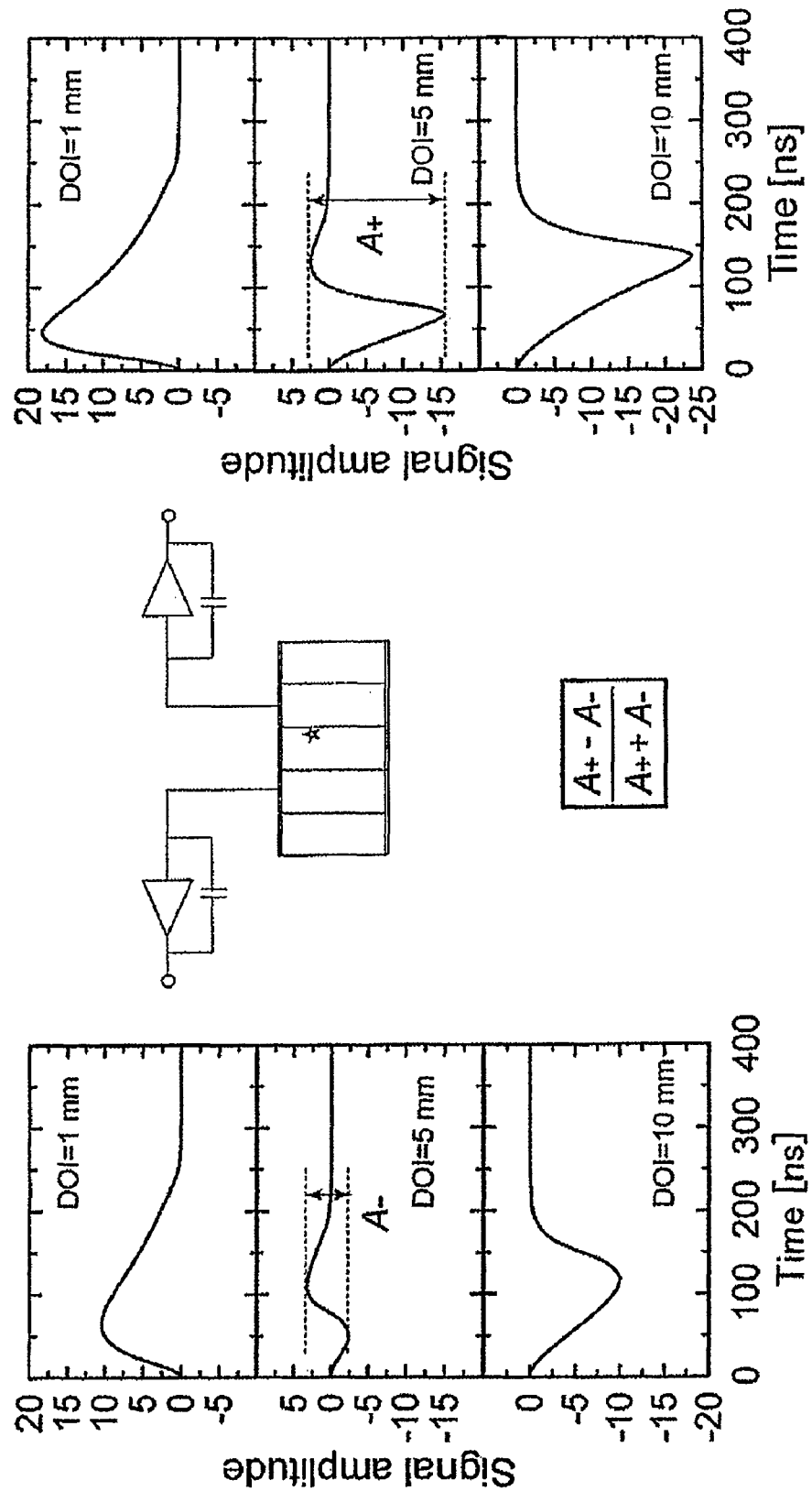
FIG. 10 shows examples of signal waveforms obtained from the electrode strips adjacent to the electrode strip closest to the interaction point.

In the following, a method of delimiting the positions of interactions in a plane parallel to the electrode (i.e. in the XY plane) will be described. FIG. 10 shows the waveforms of sub signals obtained from electrode strips adjacent to the electrode strip corresponding to an interaction point when a single interaction between gamma ray and the germanium crystal occurs. These waveforms were obtained by numerical simulations. FIG. 10 shows the waveforms of sub signals obtained in three cases in which the positions of interactions are different from each other with respect to the depth direction (i.e. DOI=1 mm, 5 mm, and 10 mm). The offset (or TOI: Transverse Position of Intersection) of the interaction point from the center line of the electrode strip having a width of 3 mm is the same in all the cases and equal to 1 mm.

The amplitude of the sub signal waveform varies depending on the TOI. Therefore, the TOI can be determined from the amplitude of the sub signal waveform. There may be employed one of the following two specific methods of calculating the TOI.
(First Method)

The region narrowing-down section 36 calculates a parameter L expressed by the following formula, as a value representing the ratio of amplitudes of sub signals obtained from adjacent electrode strips.

$$L = \frac{\sum_{t=1}^{T} |R_t| - \sum_{t=1}^{T} |L_t|}{\sum_{t=1}^{T} |R_t| + \sum_{t=1}^{T} |L_t|} \qquad \text{(formula 2)}$$

Here, Rt and Lt are the wave height values of the signals obtained from the electrode strips adjacent, on the right and left, to the electrode strip corresponding to the interaction point at time t, and T is the duration of the sub signal generated by one interaction, which is, for example, 400 ns.

Generally, the position of the interaction point P in a plane parallel to the electrode can be expressed by a function of the aforementioned parameter L that represents the ratio of amplitudes of the sub signals and DOI, that is:

$$P = F(L, \text{DOI}) \qquad \text{(formula 3)}$$

The function F varies depending on the shape of the electrode etc. Here, the case of a semiconductor detector having electrode strips having the same shape will be discussed. The sub signal induced by motion of a charge attenuates in proportion to the distance from the electrode strip on which the sub signal appears. Therefore, if depth (DOI) is constant, the TOI is the ratio of amplitudes of the sub signals obtained from the electrode strips adjacent to the electrode strip corresponding to the interaction point. Therefore, the value of TOT at the same DOI can be determined by calculating the difference between the absolute values of the amplitudes of the signals obtained from the electrode strips on the right and left of the electrode strip corresponding to the interaction point (i.e. the numerator in the right side of formula 2). Furthermore, by dividing this value by the sum of the absolute values of the amplitudes (i.e. the denominator in the right side of formula 2), the TOI can be determined independently from the DOI. Therefore, in cases where a flat plate type semiconductor detector having electrode strips having the same shape is used as with the case in this embodiment, P is equal to L (P=L), and the TOI can be determined from the ratio of the amplitudes of the sub signals. In cases where another type of detector different from the flat plate type semiconductor detector is used, the function F(L, DOI) may be obtained by experimental measurements or by simulations. Then, the TOI can be determined from the parameter L in a similar manner.
(Second Method)

The second method is similar to the first method, but in the second method a parameter L expressed by the following formula is used as a value representing the ratio of amplitudes of sub signals obtained from the adjacent electrode strips.

$$L = \frac{\sum_{t=1}^{T} |R_t - L_t|}{\sum_{t=1}^{T} |R_t| + \sum_{t=1}^{T} |L_t|} \cdot \text{sign}\left(\sum_{t=1}^{T} |R_t| - \sum_{t=1}^{T} |L_t|\right) \qquad \text{(formula 4)}$$

Here, by calculating the difference between the wave heights Rt and Lt first and then calculating the absolute value thereof, noises that are generated synchronously in Rt and Lt can be cancelled. In consequence, the TOI can be determined more accurately than the first method. However, since the absolute value is calculated after the subtraction, the sign (i.e. positive/negative sign) indicating the direction of offset from the center of the electrode strip is lost. Therefore, it is necessary to determine the sign by a calculation (i.e., the "sign" operator in formula 4).

The intensity of the sub signals is smaller than the main signals. Therefore, in order that the TOI may be calculated by this method, it is necessary that either the anode strips or the cathode strips corresponding to the positions of multiple interactions are so distant from each other that superposition of the signals does not occur. By this method, the TOI can be calculated with respect to the direction of the strip width in which superposition of the signals does not occur.

As described above, the region narrowing-down section 36 can delimit the positions of interactions to regions narrower than regions defined by pairs of anode and cathode strips. In this embodiment, then the waveform synthesis section 34 and the comparison section 35 perform synthesis of reference waveforms and comparison of the synthesized waveforms with measured signals respectively only in the narrowed-down regions.

By roughly estimating the positions of the interaction points (or the regions in which the interaction points are supposed to exist) and performing the synthesis of reference waveforms and waveform comparison only for grid points in the narrowed-down regions, the calculation amount can be made smaller and the process can be made more efficient as compared to the case in which waveform comparison is performed without narrowing down the candidate regions. For example, if the region in which one interaction is supposed to occur can be narrowed down to $1/5$ (=20%) of a region defined by a pair of strips, the calculation amount associated with a combination of two interactions can be reduced to $1/25$ (=4%).

Third Embodiment

Figure 11:
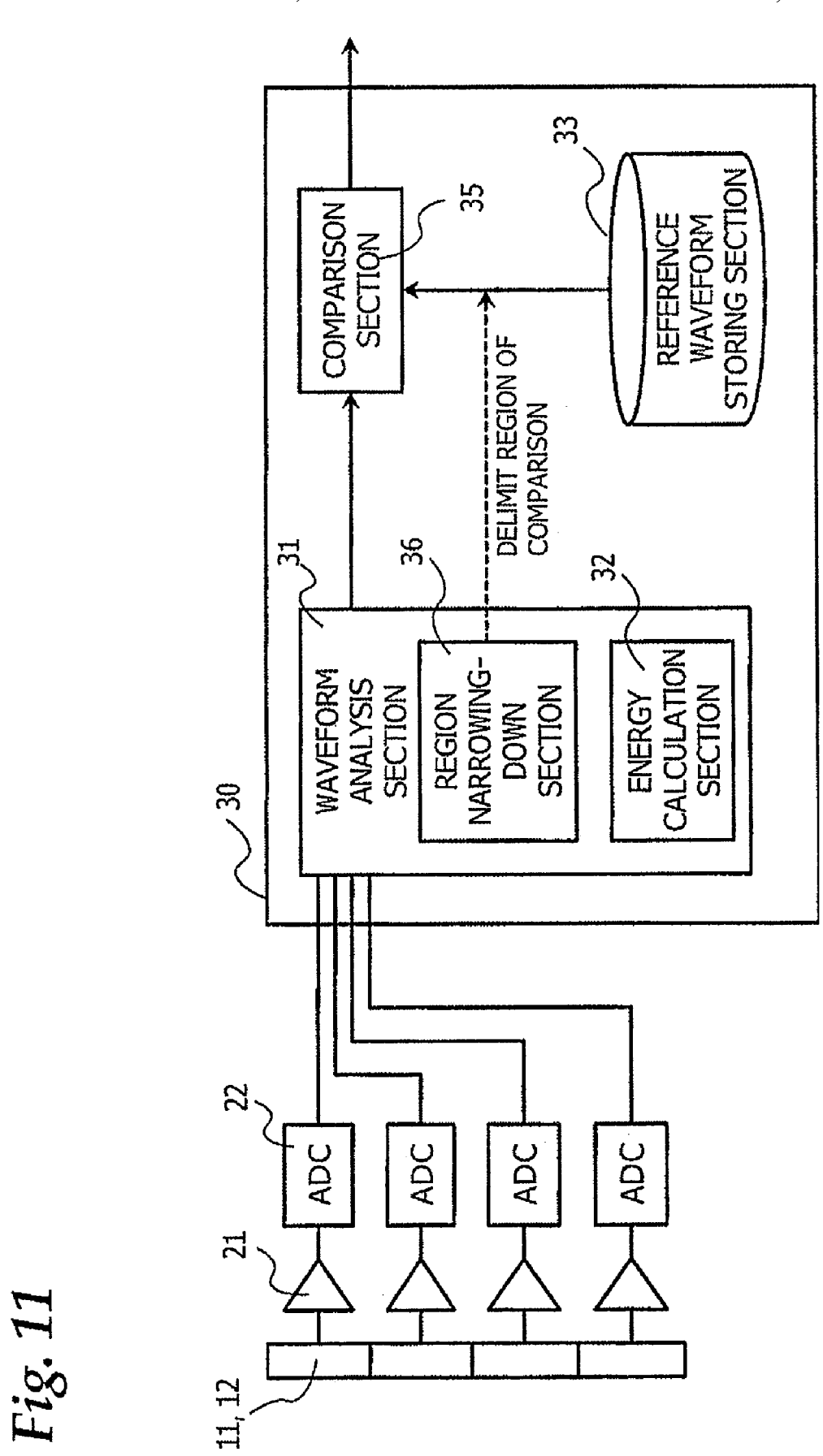
FIG. 11 is a block diagram showing an example of a signal processing section of a flat plate germanium semiconductor detector having segmented electrodes according to a third embodiment.

A third embodiment is a semiconductor detector with strip electrodes that can determine the position of an interaction efficiently with a high accuracy, when a single interaction occurs. FIG. 11 is a block diagram showing an exemplary configuration of a signal processing section of the detector according to this embodiment. The signal processing section in this embodiment may be considered to be the same as that in the second embodiment except that it lacks the waveform synthesis section.

In this embodiment, a measured signal is compared with reference waveforms for the grid points in the region defined by a pair of anode and cathode strips, and the grid point that provides the reference waveform most similar to the measured signal waveform is determined as the interaction point. Thus, the position of the interaction can be determined with a high accuracy.

In this embodiment, comparison of reference waveforms and a measured waveform is not performed for the entire region defined by a pair of anode and cathode strips but only for grid points in a region analytically determined by the region narrowing-down section 36. Thus, the calculation amount in the process of comparison with reference waveforms can be reduced, and the processing efficiency can be improved.

The method of rough calculation of the position of an interaction by the region narrowing-down section 36 is similar to that in the second embodiment. Specifically, the position with respect to the depth direction (DOI) is calculated based on the difference in the rise time between the signals obtained from the anode strip and the cathode strip, and the position with respect to the transverse direction (TOI) is calculated based on a value obtained by integrating the absolute value of the difference between the values of the signals obtained from the adjacent strips for every time.

In cases where only a single interaction occurs, the position can be roughly determined with respect to all the directions including the depth direction (i.e. Z direction), X direction, and Y direction, because superposition of signals does not occur.

Fourth Embodiment

Figure 12:
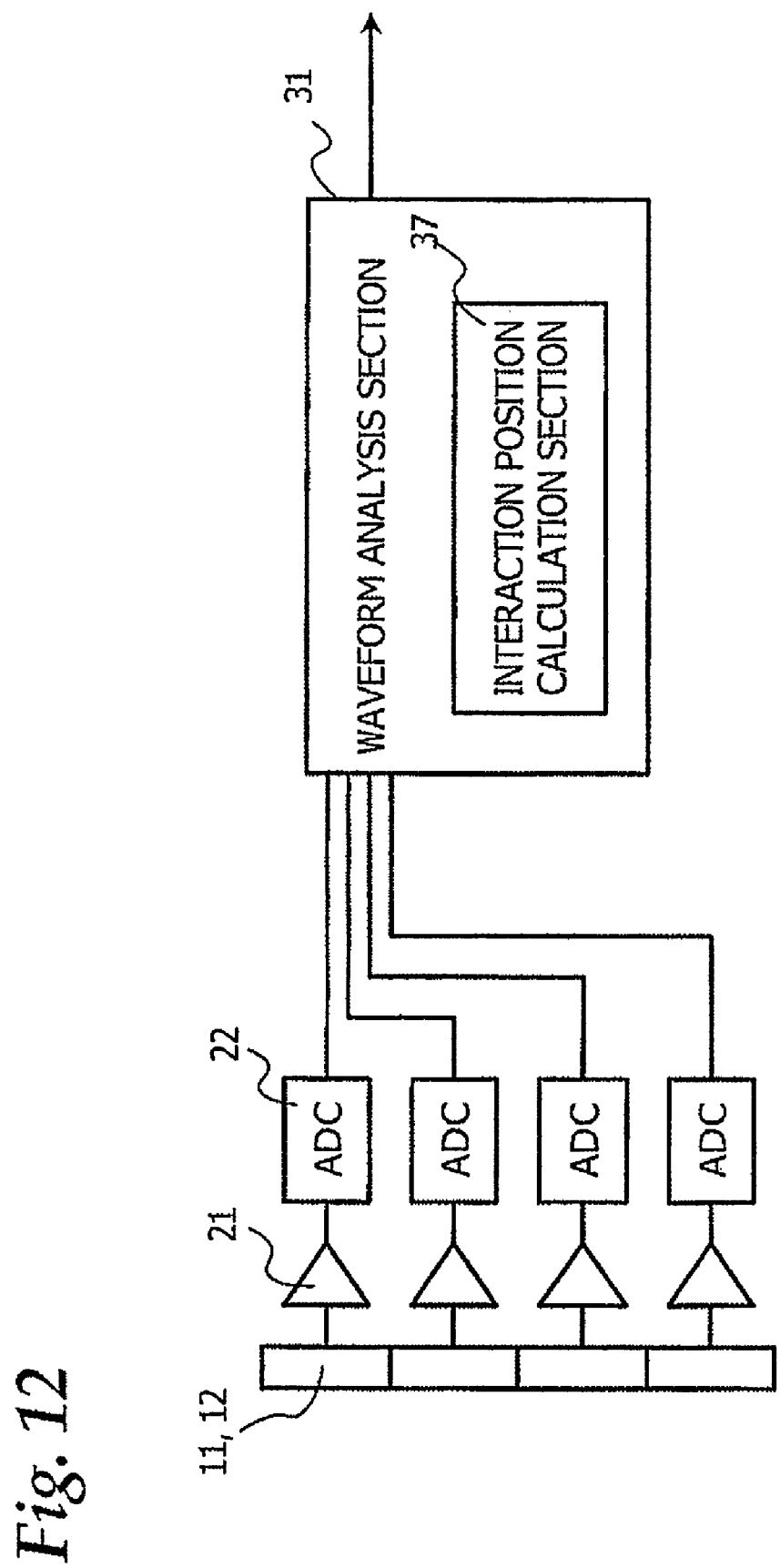
FIG. 12 is a block diagram showing an example of a signal processing section of a flat plate germanium semiconductor detector having segmented electrodes according to a fourth embodiment.

A fourth embodiment is a semiconductor detector with strip electrodes that can determine the position of an interaction analytically with high accuracy, when a single interaction occurs. FIG. 12 is a block diagram showing an exemplary configuration of a signal processing section of the detector according to this embodiment. In this embodiment, an interaction position calculation section 37 analytically calculates the position of an interaction from measurement signals.

The process performed by the interaction position calculation section 37 is the same as the process of calculating the position with respect to the depth direction (DOI) and the position with respect to the transverse direction (TOI) performed by the region narrowing-down section 36 in the second embodiment. In cases where only one interaction occurs, the position of the interaction can be determined analytically with respect to all of the X, Y, and Z directions. Furthermore, in cases where only one interaction occurs, the position determined analytically may be regarded as the position of the interaction without performing comparison with reference waveforms, because no superposition of signals occur.

(Modifications)

Figure 13:
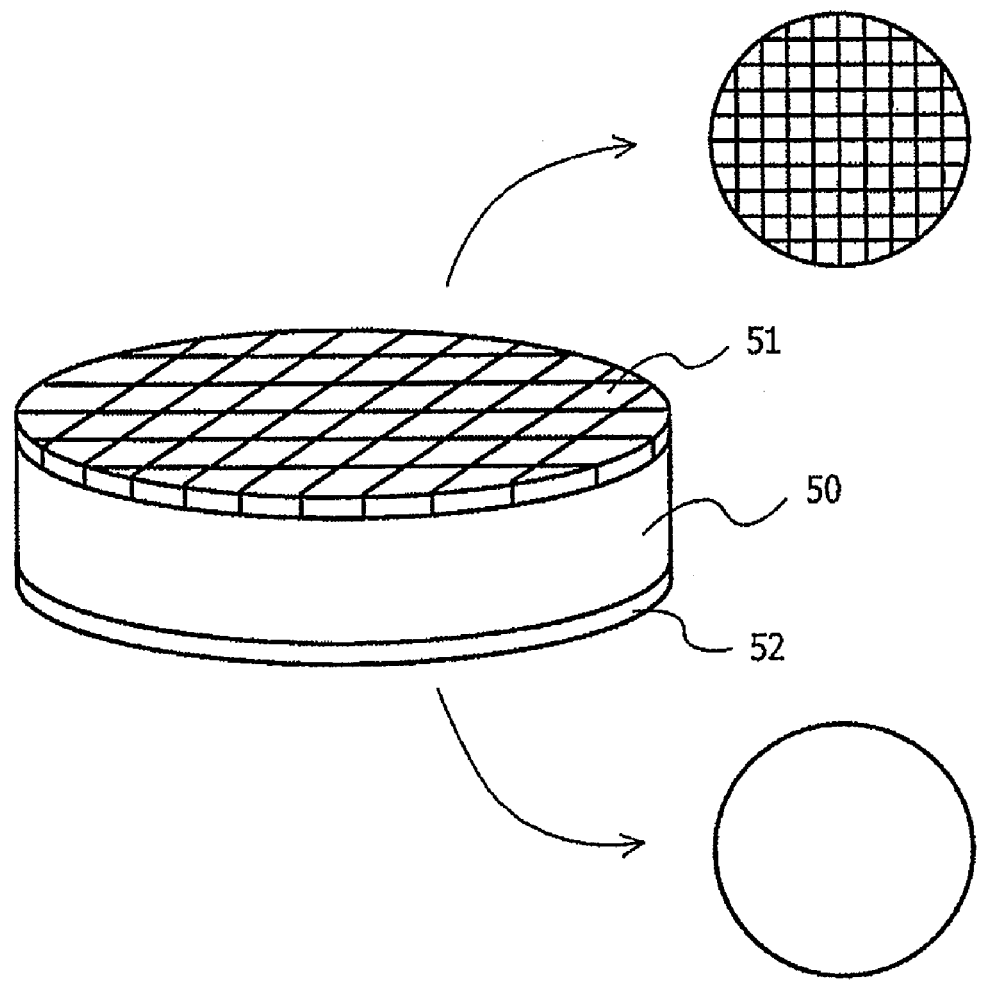
FIG. 13 illustrates a pixel type semiconductor detector.

Although germanium semiconductor detectors with strip electrodes (of a cross strip type) have been described heretofore by way of example, the present invention can also be applied to a pixel type semiconductor detector like that shown in FIG. 13 in which electrodes 51 are arranged on one surface of a crystal 50 in a grid pattern and only one electrode 52 is provided on the opposite surface. Furthermore, the present invention can be applied to not only to a flat plate semiconductor detector but also to a coaxial semiconductor detector.

In cases where a detector other than a parallel plate semiconductor detector is used, the electrode from which a main signal is detected (i.e. the electrode segment corresponding to the position of an interaction) is not necessarily the electrode closest to the position of the interaction. However, the position of an interaction can be determined from the anode electrode and the cathode electrode from which main signals are obtained with an accuracy as fine as the size of the electrode, and by comparing the signals with reference waveforms, the position of the interaction can be determined with a higher accuracy, as is the case with a parallel plate semiconductor detector.

In the embodiments described in the foregoing, the ratio of the amplitudes of sub signals obtained from the adjacent electrodes is utilized in estimating or determining the position of an interaction in the XY plane by analysis. In the case of the above-described cross strip detector, the ratio of the amplitudes of sub signals directly represents the position in the XY plane, because all the electrodes have the same size. On the other hand, in the case of a detector having a flat circular crystal plate shown in FIG. 13 or a coaxial detector, the electrodes have different shapes, and therefore the position of an interaction in the XY plane cannot be determined simply only from the ratio of the amplitudes of sub signals. In the case of a detector in which the electrodes have different shapes, the function F (formula 3) expressing the relation between the ratio of the amplitudes of sub signals and the position of an interaction may be obtained beforehand by experimental measurements or simulations, and the position of an interaction in the XY plane may be determined using this function F.

Although cases in which a germanium crystal is used as a crystal for detecting gamma ray have been described in the foregoing, the crystal for detecting gamma ray that can be used in the present invention is not limited to a germanium crystal. Advantageous effects of the present invention can also be achieved in cases where, for example, a silicon (Si) crystal or a cadmium telluride (CdTe) crystal etc. is used.

Although in the cases described in the foregoing, what is detected is gamma ray, X-ray can also be detected in a similar manner. On the other hand, alpha-ray and beta-ray travels straightly in the detector while causing a number of times of interaction from the moment they enter the detector to lose their entire energy. Consequently, they cannot be detected in terms of multiple interactions, but only the TOT position detection based on the integration of the absolute values of sub signals (in the fourth embodiment) can be applied to them.

That which is claimed:

1. A semiconductor radiation detection apparatus that has a semiconductor detector including a semiconductor crystal, a plurality of segmented electrodes provided on a first surface of said crystal, and from one to a plurality of electrodes provided on a second surface of said crystal and detects, when an interaction between radiation and the semiconductor crystal occurs multiple times, the positions of the multiple interactions based on a signal obtained from the semiconductor detector, comprising:
    storing means for storing beforehand reference waveforms, which are waveforms of signals that will be obtained from said segmented electrodes when a single interaction occurs, for a plurality of positions in said crystal;
    energy calculation means for calculating energy deposit values at the interaction positions based on signals obtained from segmented electrodes corresponding to the interaction positions;
    synthesized waveform calculation means for synthesizing reference waveforms corresponding to two candidate points of interaction positions selected arbitrarily in said crystal at a ratio equal to a ratio of said energy deposit values, for a plurality of combinations of two candidate points; and
    interaction position detection means for comparing the synthesized waveforms synthesized by said synthesized waveform calculation means with a waveform obtained from said segmented electrode and determining that candidate points from which the most similar waveform is obtained are the interaction positions.

2. A semiconductor radiation detection apparatus according to claim 1, further comprising interaction region estimation means for roughly estimating the interaction position from the waveform of a signal obtained from said segmented electrode, wherein said interaction position detection means performs synthesis of reference waveforms and comparison of the synthesized waveforms and the waveform obtained from said segmented electrode for candidate points in the region estimated by said interaction region estimation means.

3. A semiconductor radiation detection apparatus according to claim 2, wherein said interaction region estimation means estimates a depth of the interaction position from a surface of the crystal based on a difference between the time taken from the occurrence of the interaction until the amplitude of a signal obtained from said segmented electrode provided on said first surface reaches a specific fraction of its maximum value and the time taken from the occurrence of the interaction until the amplitude of a signal obtained from said segmented electrode provided on said second surface reaches the specific fraction of its maximum value.

4. A semiconductor radiation detection apparatus according to claim 2, wherein said interaction region estimation means estimates the interaction position in a plane parallel to the segmented electrodes based on a ratio of the amplitudes of signals obtained from segmented electrodes adjacent to the segmented electrode corresponding to the position at which the interaction occurs.

5. A semiconductor radiation detection apparatus according to claim 4, wherein said interaction region estimation means calculates a sum of absolute values of differences between signal values of the adjacent segmented electrodes or differences between absolute signal values of the adjacent segmented electrodes at different times, and estimates the interaction position in the plane parallel to the segmented electrodes based on the sum.

6. A semiconductor radiation detection apparatus that has a semiconductor detector including a semiconductor crystal, a plurality of segmented electrodes provided on a first surface of said crystal, and one or plurality of electrodes provided on a second surface of said crystal and detects the position of an interaction between radiation and the semiconductor crystal based on a signal obtained from the semiconductor detector, comprising:
    storing means for storing beforehand reference waveforms, which are waveforms of signals that will be obtained from said segmented electrodes when a single interaction occurs, for a plurality of positions in said crystal;
    interaction position detection means for comparing a signal obtained from said segmented electrode with the reference waveforms for the respective positions in said crystal and determining that a position for which the reference waveform and the waveform of the obtained signal are most similar is the interaction position; and
    interaction region estimation means for roughly estimating the interaction position from the waveform of the signal obtained from said segmented electrode,
    wherein said interaction position detection means compares the signal obtained from said segmented electrode and the reference waveforms for positions in the region estimated by said interaction position estimation means to determine the interaction position.

7. A semiconductor radiation detection apparatus according to claim 6, wherein said interaction region estimation means estimates a depth of the interaction position from a surface of the crystal based on a difference between the time taken from the occurrence of the interaction until the amplitude of a signal obtained from said segmented electrode provided on said first surface reaches a specific fraction of its maximum value and the time taken from the occurrence of the interaction until the amplitude of a signal obtained from said segmented electrode provided on said second surface reaches the specific fraction of its maximum value.

8. A semiconductor radiation detection apparatus according to claim 6, wherein said interaction region estimation means estimates the interaction position in a plane parallel to the segmented electrodes based on a ratio of the amplitudes of signals obtained from segmented electrodes adjacent to the segmented electrode corresponding to the position at which the interaction occurs.

9. A semiconductor radiation detection apparatus according to claim 8, wherein said interaction region estimation means calculates a sum of absolute values of differences between signal values of the adjacent segmented electrodes or differences between absolute signal values of the adjacent segmented electrodes at different times, and estimates the interaction position in the plane parallel to the segmented electrodes based on the sum.

10. A semiconductor radiation detection apparatus that has a semiconductor detector including a semiconductor crystal, a plurality of segmented electrodes provided on a first surface of said crystal, and one or plurality of electrodes provided on a second surface of said crystal and detects the position of an interaction between radiation and the semiconductor crystal based on a signal obtained from the semiconductor detector, the apparatus comprising interaction position detection means for calculating a sum of absolute values of differences between signal values of segmented electrodes adjacent to the segmented electrode corresponding to the position at which the interaction occurs or differences between absolute signal values of the segmented electrodes adjacent to the segmented electrode corresponding to the position at which the interaction occurs at different times, and determining the interaction position in a plane parallel to the segmented electrodes based on the sum.

11. A semiconductor radiation detection apparatus that has a semiconductor detector including a semiconductor crystal, a plurality of segmented electrodes provided on a first surface of said crystal, and from one to a plurality of electrodes provided on a second surface of said crystal, wherein when an interaction between radiation and the semiconductor crystal occurs multiple times, the semiconductor radiation detection apparatus detects the positions of the multiple interactions based on a signal obtained from the semiconductor detector, the semiconductor radiation detection apparatus further comprising a processor programmed to execute steps of:

storing beforehand reference waveforms, which are waveforms of signals that will be obtained from said segmented electrodes when a single interaction occurs, for a plurality of positions in said crystal;

calculating energy deposit values at the interaction positions based on signals obtained from segmented electrodes corresponding to the interaction positions;

synthesizing reference waveforms corresponding to two candidate points of interaction positions selected arbitrarily in said crystal at a ratio equal to a ratio of said energy deposit values, for a plurality of combinations of two candidate points; and comparing the synthesized waveforms synthesized by said synthesized waveform calculation means with a waveform obtained from said segmented electrode and determining that candidate points from which the most similar waveform is obtained are the interaction positions.

12. A semiconductor radiation detection apparatus according to claim 11, further comprising interaction region estimation means for roughly estimating the interaction position from the waveform of a signal obtained from said segmented electrode, wherein said interaction position detection means performs synthesis of reference waveforms and comparison of the synthesized waveforms and the waveform obtained from said segmented electrode for candidate points in the region estimated by said interaction region estimation means.

13. A semiconductor radiation detection apparatus according to claim 12, wherein the processor is programmed to estimate a depth of the interaction position from a surface of the crystal based on a difference between the time taken from the occurrence of the interaction until the amplitude of a signal obtained from said segmented electrode provided on said first surface reaches a specific fraction of its maximum value and the time taken from the occurrence of the interaction until the amplitude of a signal obtained from said segmented electrode provided on said second surface reaches the specific fraction of its maximum value.

14. A semiconductor radiation detection apparatus according to claim 12, wherein the processor is programmed to estimate the interaction position in a plane parallel to the segmented electrodes based on a ratio of the amplitudes of signals obtained from segmented electrodes adjacent to the segmented electrode corresponding to the position at which the interaction occurs.

15. A semiconductor radiation detection apparatus according to claim 14, wherein the processor is programmed to calculate a sum of absolute values of differences between signal values of the adjacent segmented electrodes or differences between absolute signal values of the adjacent segmented electrodes at different times, and estimate the interaction position in the plane parallel to the segmented electrodes based on the sum.

* * * * *